(12) United States Patent
Attarwala

(10) Patent No.: US 11,057,281 B2
(45) Date of Patent: *Jul. 6, 2021

(54) DETERMINATION OF QUALITY OF SERVICE OF A NETWORK TUNNEL

(71) Applicant: Cisco Technology, Inc., San Jose, CA (US)

(72) Inventor: Murtuza S. Attarwala, Davis, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/712,049

(22) Filed: Dec. 12, 2019

(65) Prior Publication Data

US 2020/0120002 A1  Apr. 16, 2020

Related U.S. Application Data

(63) Continuation of application No. 15/602,038, filed on May 22, 2017, now Pat. No. 10,523,528.

(51) Int. Cl.
*H04W 36/00* (2009.01)
*H04L 12/24* (2006.01)
(Continued)

(52) U.S. Cl.
CPC ...... *H04L 41/5038* (2013.01); *H04L 12/4633* (2013.01); *H04L 41/08* (2013.01); *H04L 43/087* (2013.01); *H04L 43/0829* (2013.01); *H04L 43/0864* (2013.01); *H04L 43/10* (2013.01); *H04L 43/106* (2013.01); *H04L 45/22* (2013.01)

(58) Field of Classification Search
None
See application file for complete search history.

(56) References Cited

U.S. PATENT DOCUMENTS 7,715,309 B2  5/2010  Scholl et al.
7,760,636 B1  7/2010  Cheriton
(Continued)

FOREIGN PATENT DOCUMENTS

WO  2006029400 A2  3/2006

OTHER PUBLICATIONS

International Search Report and Written Opinion from the International Searching Authority, dated Jul. 25, 2018, 20 pages, for corresponding International Patent Application No. PCT/US2018/032673.

(Continued)

*Primary Examiner* — Sithu Ko
(74) *Attorney, Agent, or Firm* — Polsinelli PC

(57) ABSTRACT

In some examples, an example method to measure quality of service (QoS) of a network tunnel may include configuring a network tunnel from a tunnel source endpoint to a tunnel destination endpoint, transmitting multiple status packets to the tunnel destination endpoint, receiving multiple forwarded status packets from the tunnel destination endpoint, determining a time of receipt of each of the forwarded status packets, and determining a QoS measure of the network tunnel based on a time of transmission of each of the multiple status packets and the time of receipt of each of the forwarded status packets.

20 Claims, 6 Drawing Sheets

(51) Int. Cl.
*H04L 12/46* (2006.01)
*H04L 12/26* (2006.01)
*H04L 12/707* (2013.01)

(56) References Cited

U.S. PATENT DOCUMENTS

| | | | |
|---|---|---|---|
| 7,940,685 B1 | 5/2011 | Breslau et al. | |
| 8,107,363 B1* | 1/2012 | Saluja | H04L 45/50 |
| | | | 370/228 |
| 8,400,910 B1* | 3/2013 | Busch | H04L 1/22 |
| | | | 370/217 |
| 9,608,859 B2* | 3/2017 | Gupta | H04L 41/0663 |
| 9,769,044 B1 | 9/2017 | Cirkovic et al. | |
| 9,787,559 B1 | 10/2017 | Schroeder | |
| 2005/0094567 A1 | 5/2005 | Kannan et al. | |
| 2006/0168612 A1 | 7/2006 | Chapman et al. | |
| 2008/0195733 A1 | 8/2008 | Detienne et al. | |
| 2008/0291910 A1* | 11/2008 | Tadimeti | H04L 49/351 |
| | | | 370/389 |
| 2013/0308597 A1 | 11/2013 | Murphy et al. | |
| 2015/0281028 A1 | 10/2015 | Akhter et al. | |
| 2016/0127149 A1 | 5/2016 | Xue et al. | |
| 2016/0323782 A1 | 11/2016 | Baillargeon et al. | |
| 2018/0248713 A1* | 8/2018 | Zanier | H04L 12/4633 |

OTHER PUBLICATIONS

Communication pursuant to Article 94(3) EPC issued by the European Patent Office dated Dec. 9, 2020, 18 pages, for corresponding European Patent Application No. 18731561.1.

\* cited by examiner

DETERMINATION OF QUALITY OF SERVICE OF A NETWORK TUNNEL

CROSS-REFERENCE TO RELATED APPLICATION

The instant application is a Continuation of, and claims priority to, U.S. patent application Ser. No. 15/602,038 entitled DETERMINATION OF QUALITY OF SERVICE OF A NETWORK TUNNEL filed May 22, 2017, the contents of which are herein incorporated by reference in its entirety.

FIELD

The present disclosure relates generally to network communications.

BACKGROUND

Routers are networking devices that forward data packets between networks. A router reads the address information in a packet to determine the ultimate destination, for example, a domain (e.g., application). Then, using information in its routing table or routing policy, the router forwards the packet to the next hop or location in the packet's journey to the ultimate destination. When there are more than one route from the router to the ultimate destination, the router may be tasked with forwarding the packet according to a policy (e.g., forward over the best route to reach the intended domain).

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to measure quality of service (QoS) of a network tunnel at an endpoint are described. An example method to measure QoS of a network tunnel may include configuring a network tunnel from a tunnel source endpoint to a tunnel destination endpoint, and transmitting multiple status packets to the tunnel destination endpoint. Each of the status packets may include a timestamp in a payload field of the status packet, where the timestamp indicates a time of transmission of the respective status packet from the tunnel source endpoint to the tunnel destination endpoint. The method may also include receiving multiple forwarded status packets from the tunnel destination endpoint, where each of the forwarded status packets may be a return of a corresponding status packet transmitted by the tunnel source endpoint to the tunnel destination endpoint. The method may further include determining a time of receipt of each of the forwarded status packets, and determining a QoS measure of the network tunnel based on the time of transmission of each of the multiple status packets and the time of receipt of each of the forwarded status packets.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
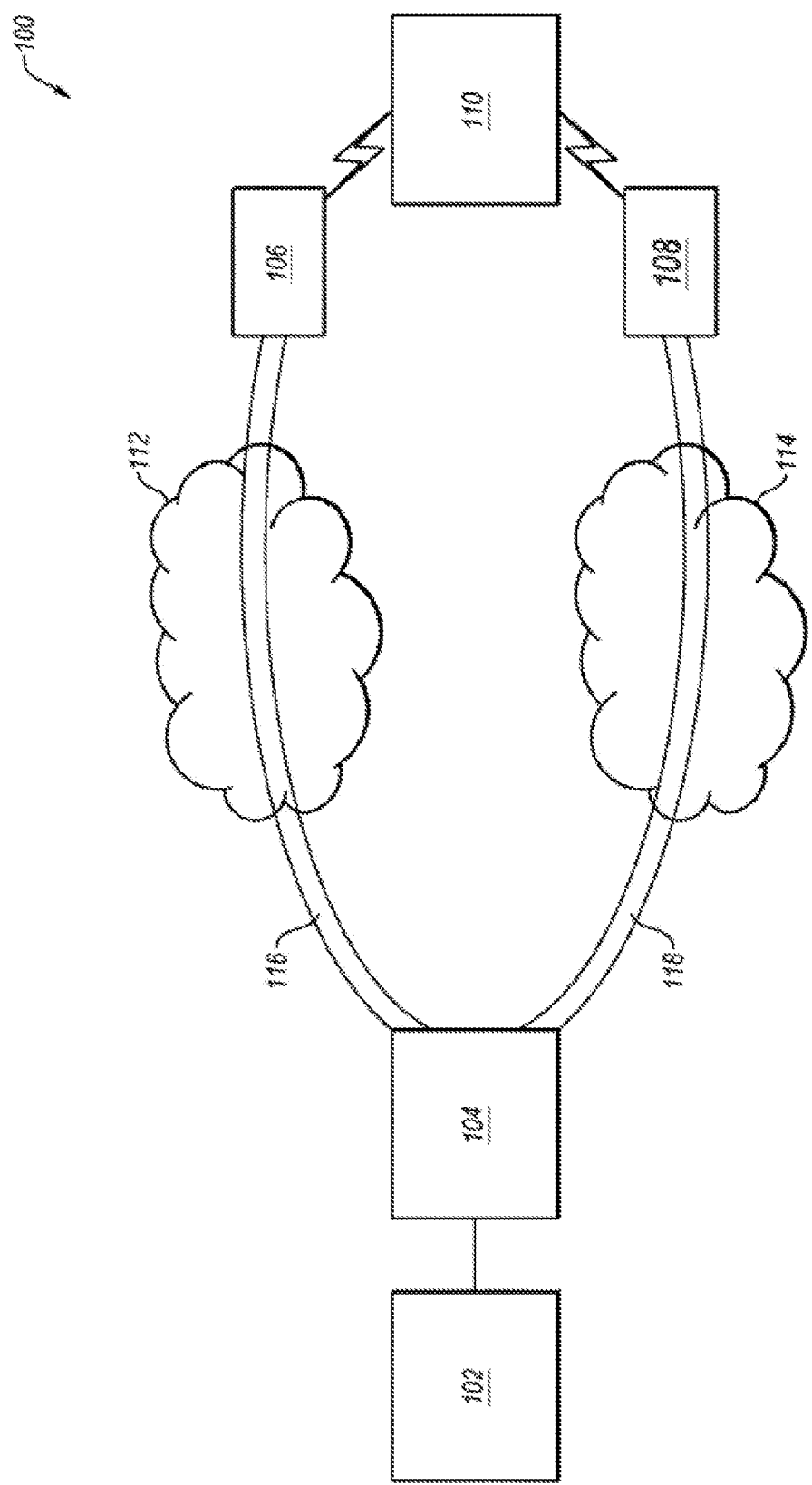
FIG. 1 illustrates an overview of an environment and devices on which some embodiments of the present disclosure may operate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to determining quality of service (QoS) measures of network tunnels.

As discussed above, a router may be tasked with forwarding a packet according to a policy when there are more than one route from the router to an ultimate destination. In order to apply its policy, the router may need to identify the packet's intended domain (the web site). The router may perform deep packet inspection (DPI) of the packet to determine the intended domain. DPI is a form of filtering that examines the data part of the packet. Thus, by inspecting the data portion of the packet, the router is able to determine the intended domain, and forward the packet according to its policy. Unfortunately, this is not possible when the data in the packet is encrypted, as is the case with most packets today.

Unable to determine the intended domain by inspecting the data portion of the packet, the router arbitrarily forwards the packet over one of the available routes. The router is then able to determine the preferred route for the domain by inspecting the certificate exchange packets between the client and the server (domain server). This is possible because the addressing information in the certificate exchange packets is in the open. Unfortunately, the router may need to arbitrarily forward several packets before it is able to determine the preferred route by inspecting the certificate exchange packets. This may result in the router forwarding the pre-identified packets (packets prior to determining the preferred route) over one route, and forwarding the post identified packets over a different (preferred) route.

Many domains implement proxies, for example, to provide security for their internal networks. When a proxy is present, the address information in the data packets, including the security exchange packets, are of the proxy. Thus, the router is unable to determine the preferred route by inspecting the certificate exchange packets because the address is that of the proxy and not the domain.

The router may also establish tunnels to forward data packets to the intended domain. Tunneling, also referred to as port forwarding, is a protocol that allows for the movement of data from one network to another network. Tunneling involves private network communications sent across a public network through a process called encapsulation. The encapsulation process allows for the transmission of data intended for use in a private network through a public network in a manner that the routing nodes in the public network are unaware that the transmission is part of a private network. Even with tunneling, the router is unable to determine the preferred route to a domain when proxies are present.

A tunnel is a link across a network, and extends between two network endpoints, a tunnel source endpoint and a tunnel destination endpoint. Once a tunnel is configured, the tunnel source endpoint is able to transmit data intended for a destination (such as a domain, an application, and/or others), through the tunnel to the tunnel destination endpoint, for forwarding to the destination. In this manner, the data may be sent to its intended destination over the network across which the tunnel is configured.

It may be typical for more than one network to provide access to the destination. That is, data may be transmitted over any one of the multiple number of networks to reach the intended destination. Where multiple networks are available over which data may be transmitted to reach the destination, a tunnel may be configured across one or more of the networks. Generic routing encapsulation (GRE), developed by Cisco Systems, is one suitable tunneling protocol with which to configure a tunnel. A GRE tunnel is a logical interface on a router that allows for the encapsulation of data packets inside a transport protocol.

The present disclosure generally describes determining QoS measures of one or more tunnels suitable for sending data packets to a destination, and selecting one of the tunnels, based on the QoS measures, through which data packets may be transmitted for forwarding to the destination. The present disclosure takes advantage of the realization that multiple tunnels may be available to reach a destination, and that a tunnel source endpoint may transmit data packets through any one of the multiple tunnels and have the data packets forwarded to their intended destination.

In some embodiments, the present disclosure may use "hello" or status packets to determine QoS measures, such as, latency, jitter, loss, and/or the like, of a tunnel. The "hello" or status packets are packets that may be used by a tunnel source endpoint to determine the health or status of a network tunnel. For example, at specific time intervals, a network source endpoint may transmit a status packet through a tunnel to a network destination endpoint. The network destination endpoint, upon receiving a status packet, may return the received status packet through the tunnel to the network source endpoint. The network source endpoint may determine the status, including QoS measures, of the tunnel based on the metrics associated with the sent and received status packets.

In the instance of GRE tunnels, GRE keepalive packets may be used to determine QoS measures, such as, latency, jitter, loss, and/or the like, of a GRE tunnel. The present disclosure may specify a keepalive transmit time interval. The keepalive transmit time interval is a time or frequency at which the tunnel source endpoint transmits a GRE keepalive packet through the GRE tunnel to the tunnel destination endpoint. The tunnel destination endpoint forwards or reflects the received keepalive packet back to the tunnel source endpoint through the GRE tunnel.

Accordingly, a tunnel source endpoint may create a GRE keepalive packet for transmission at the specified time interval to a tunnel destination endpoint. The tunnel source endpoint may include a timestamp in a payload field of the GRE keepalive packet to indicate a time that the GRE keepalive packet is being transmitted to the tunnel destination endpoint. At the specified time interval, the tunnel source endpoint may transmit the GRE keepalive packet through the GRE tunnel to the tunnel destination endpoint, and wait to receive a forwarded GRE keepalive packet. The forwarded GRE keepalive packet is the transmitted GRE keepalive packet that is reflected or returned by the tunnel destination endpoint back to the tunnel source endpoint. In some embodiments, the tunnel source endpoint may maintain a record of the transmission times that each GRE keepalive packet is being transmitted to the tunnel destination endpoint.

Upon receiving a forwarded GRE keepalive packet, the tunnel source endpoint may determine a time it received the forwarded GRE keepalive packet (receipt time of the forwarded GRE keepalive packet). The tunnel source endpoint may also determine the time it transmitted the corresponding GRE keepalive packet (i.e., the GRE keepalive packet that produced the forwarded GRE keepalive packet) from the timestamp included in the payload field of the forwarded GRE keepalive packet. The tunnel destination endpoint does not alter the contents of the payload field when forwarding the GRE keepalive packet back to the tunnel source endpoint. The tunnel source endpoint may then determine a round trip time (e.g., a round trip latency) for the GRE tunnel from the transmit time of the GRE keepalive packet and the receipt time of the forwarded GRE keepalive packet. For example, the round trip latency of the GRE tunnel may be determined as the difference between the transmit time of the GRE keepalive packet and the receipt time of the forwarded GRE keepalive packet.

The tunnel source endpoint may transmit multiple GRE keepalive packets, one GRE keepalive packet at each specified keepalive transmit time interval. As a result, the tunnel source endpoint may receive a multiple number of forwarded GRE keepalive packets. The tunnel source endpoint may determine a receipt time for each of the received forwarded GRE keepalive packets, a transmit time from the payload field of each of the received forwarded GRE keepalive packets, and determine multiple round trip times. From the multiple round trip times, the tunnel source endpoint may determine a jitter for the GRE tunnel. For example, the jitter of the GRE tunnel may be determined as the difference between two successive latencies.

The tunnel source endpoint may also determine the number of transmitted GRE keepalive packets that are lost. It is possible that a transmitted GRE keepalive packet may be dropped, for example, during transmission or by the tunnel destination endpoint. In this instance, the tunnel source endpoint may not receive a forwarded GRE keepalive packet subsequent to transmitting a GRE keepalive packet. The tunnel source endpoint may maintain a count of the number of transmitted GRE keepalive packets that are lost. For example, the tunnel source endpoint may transmit a GRE keepalive packet and wait for a specific period of time to receive a forwarded GRE keepalive packet. The specific period of time may be a time period within which the tunnel source endpoint expects to receive the forwarded GRE keepalive packet. The tunnel source endpoint may set or determine the specific period of time, and the specific period of time may be set to a value that is sufficient for a packet to traverse the GRE tunnel from one endpoint to the other endpoint, and back. The tunnel source endpoint may consider a transmitted GRE keepalive packet to be lost if a forwarded GRE keepalive packet is not received within the specific period of time. Accordingly, the tunnel source endpoint may determine a loss measure of the GRE tunnel.

The tunnel source endpoint may determine the QoS of each of the available GRE tunnels based on the latency, jitter, loss, and/or the like, of each GRE tunnel. With knowledge of the QoS of each of the available GRE tunnels, the tunnel source endpoint may select a GRE tunnel to transmit data packets through based on the applicable policy or policies. For example, assuming that the applicable policy is to use the GRE tunnel with the least packet loss, the tunnel source endpoint may apply this policy and select the GRE tunnel having the least packet loss measure. As another example, assuming that the applicable policy is to use the GRE tunnel providing the best performance, the tunnel source endpoint may apply this policy and use the latency, jitter, loss, and/or the like, measures to select the GRE tunnel that provides the best performance. Although described in the context of a GRE tunnel and a GRE keepalive packet, it will be appreciated that any network tunnel and any packet that may be transmitted and reflected back through the network tunnel are also within the scope of the present disclosure.

FIG. 1 illustrates an overview of an environment 100 and devices on which some embodiments of the present disclosure may operate, arranged in accordance with at least some embodiments described herein. Environment 100 may include a client device 102, edge network devices 104, 106, and 108, and a cloud domain 110. Client device 102 may be logically connected to edge network device 104. Cloud domain 110 may be logically connected to edge network devices 106 and 108. Cloud domain 110 may provide a service or an application, and may be reachable by client device 102 over a network 112 or a network 114.

For example, edge network device 104 may be an edge router located or provided at the boundary of networks 112 and 114, between client device 102 and networks 112 and 114. Edge network device 106 may be an edge router located or provided at the boundary of network 112, between cloud domain 110 and network 112. Similarly, edge network device 108 may be an edge router located or provided at the boundary of network 114, between cloud domain 110 and network 114.

To facilitate movement of data from client device 102 to cloud domain 110 over network 112, a tunnel 116 may be configured between edge network device 104 and edge network device 106. With regards to tunnel 116, edge network device 104 may be the tunnel source endpoint, and edge network device 106 may be the tunnel destination endpoint. Similarly, to facilitate movement of data from client device 102 to cloud domain 110 over network 114, a tunnel 118 may be configured between edge network device 104 and edge network device 108. With regards to tunnel 118, edge network device 104 may be the tunnel source endpoint, and edge network device 108 may be the tunnel destination endpoint.

In one example use scenario, cloud domain 110 may be a cloud application, and a user at client device 102 may execute a browser application to connect to and communicate with the cloud application at cloud domain 110. Data packets from client device 102 destined for cloud domain 110 may be sent to edge network device 104, for transmission through either tunnel 116 or tunnel 118. In some embodiments, edge network device 104 may select a tunnel, either tunnel 116 or tunnel 118, to use to transmit the data packets destined for the cloud application at cloud domain 110 based on one or more policies and/or one or more properties of the available tunnels. For example, the policy may specify that the data packets be transmitted through the tunnel that provides the better quality of serve (QoS). Examples of policies may include selecting the tunnel with the least latency, least jitter, least packet loss, etc. Edge network device 104 may identify one of the available tunnels as a preferred tunnel, and send the data packets from client device 102 destined for the cloud application at cloud domain 110 through the preferred tunnel.

In some embodiments, one or more of edge network devices 104, 106, and 108 and/or cloud domain 110 may be implemented as one or more virtual machines operating on one or more physical computing devices. Additionally or alternatively, edge network devices 104, 106, and 108 and/or cloud domain 110 may each include an individual stand-alone computing device.

Modifications, additions, or omissions may be made to environment 100 of FIG. 1 without departing from the scope of the present disclosure. For example, while illustrated as including three edge network devices 104, 106, and 108, two networks 112 and 114, two tunnels 116 and 118, and one cloud domain 110, environment 100 may include any number of edge network devices, networks, tunnels, and/or cloud domains, such as thousands or tens of thousands of edge network devices, more than two networks, more than two tunnels, and multiple cloud services. As another example, environment 100 may also include other network devices such as firewalls, proxies, gateways, etc. As an additional example, there may be two tunnels and/or two networks between two edge network devices (e.g., there may be two networks, each with their own tunnel between the edge network device 104 and the edge network device 106).

Figure 2:
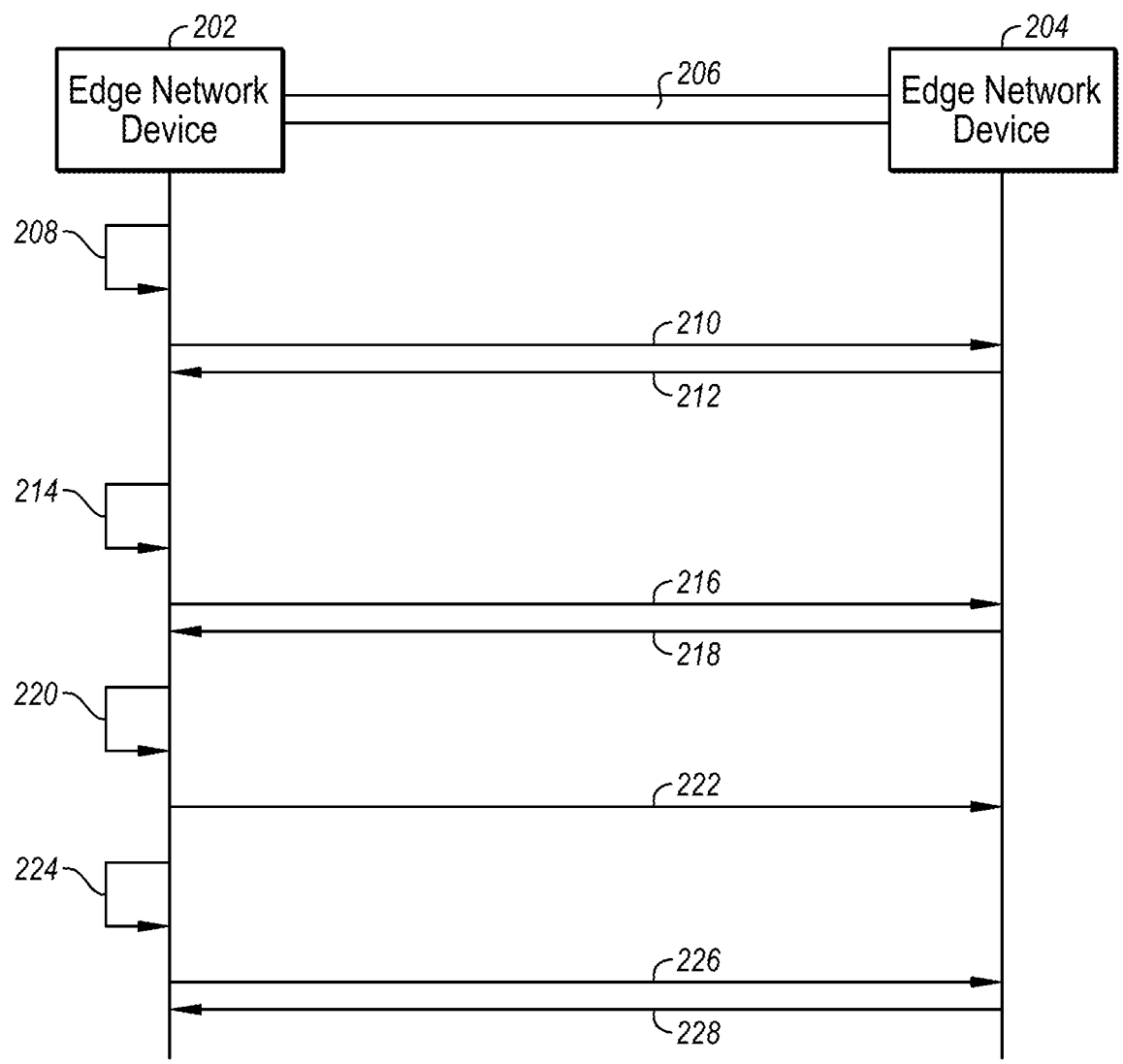
FIG. 2 is a sequence diagram that illustrates the use of GRE keepalive packets to determine QoS measures.

FIG. 2 is a sequence diagram that illustrates the use of GRE keepalive packets to determine QoS measures, arranged in accordance with at least some embodiments described herein. As depicted, the sequence diagram illustrates communication between an edge network device 202 and an edge network device 204 through a tunnel 206 configured between edge network devices 202 and 204. For example, edge network devices 202 and 204 may be edge routers at each end of tunnel 206, and tunnel 206 may be a GRE tunnel across a network (not depicted), such as a Verizon network. Edge network device 202, as a tunnel source endpoint, may want to determine the QoS of the GRE tunnel using GRE keepalive packets. Edge network device 202 may determine a keepalive transmit time interval for transmitting the GRE keepalive packets. Edge network device 202 may also determine a specific period of time within which edge network device 202 expects to receive a forwarded GRE keepalive packet subsequent to transmitting a GRE keepalive packet.

As the tunnel source endpoint, edge network device 202 may create a GRE keepalive packet (208) to be transmitted to edge network device 204, which is the tunnel destination endpoint. At the specified keepalive transmit time interval, edge network device 202 may determine a current time, and include the current time as a timestamp in the payload field of the GRE keepalive packet, and transmit the GRE keepalive packet (210) to edge network device 204 through tunnel 206. Edge network device 204 may receive the GRE keepalive packet and reflect (e.g., or otherwise return) the GRE keepalive packet back to edge network device 202 as a forwarded GRE keepalive packet (212). Edge network device 202 may receive the forwarded GRE keepalive packet and record a time of receipt (e.g., a time that it received the forwarded GRE keepalive packet). Edge network device 202 may calculate a round trip latency measure of tunnel 206 as the difference between the time the forwarded GRE keepalive packet was received and the time the GRE keepalive packet was transmitted. In a similar manner, edge network device 202 may create a GRE keepalive packet (214) and, at the next specified keepalive transmit time interval, include a current time as a timestamp in the payload field of the GRE keepalive packet, and transmit the GRE keepalive packet (216) to edge network device 204 through tunnel 206. Edge network device 204 may reflect the GRE keepalive packet back to edge network device 202 as a forwarded GRE keepalive packet (218), and edge network device 202 may record a time that it received the forwarded GRE keepalive packet. Edge network device 202 may calculate another round trip latency measure of tunnel 206 as the difference between the time the forwarded GRE keepalive packet was received and the time the GRE keepalive packet was transmitted. Having two successive round trip latency measures, edge network device 202 may calculate a jitter measure of tunnel 206 as the difference between the two successive round trip latency measures.

Edge network device 202 may create a GRE keepalive packet (220) and, at the next specified keepalive transmit time interval, include a current time as a timestamp in the payload field of the GRE keepalive packet, and transmit the GRE keepalive packet (222) to edge network device 204 through tunnel 206. Edge network device 202 may then wait to receive a forwarded GRE keepalive packet for the specific period of time within which the forwarded GRE keepalive packet is expected to be received. Failing to receive a forwarded GRE keepalive packet within the specific period of time, edge network device 202 may consider the GRE keepalive packet as a lost packet, and increment a count of the number of lost packets over tunnel 206.

Edge network device 202 may create a GRE keepalive packet (224) and, at the next specified keepalive transmit time interval, include a current time as a timestamp in the payload field of the GRE keepalive packet, and transmit the GRE keepalive packet (226) to edge network device 204 through tunnel 206. Edge network device 204 may reflect the GRE keepalive packet back to edge network device 202 as a forwarded GRE keepalive packet (228), and edge network device 202 may record a time that it received the forwarded GRE keepalive packet. Edge network device 202 may create and transmit a GRE keepalive packet to edge network device 204 through tunnel 206 at the specified keepalive transmit time intervals. Edge network device 202 may then calculate additional round trip latency measures and/or other jitter measures of tunnel 206. Edge network device 202 may also maintain a count of additional lost packets over tunnel 206.

In some embodiments, edge network device 202 may average the QoS measures, such as latency, jitter, loss, etc., over a specific QoS measurement time period. For example, over a specific QoS measurement time period (for example, five minutes), edge network device 202 may have transmitted ten GRE keepalive packets and calculated the round trip latencies as shown in the following table:

|  | Round Trip Latency | Lost Packet? |
|---|---|---|
| GRE Keepalive Packet 1 | 20 secs. | |
| GRE Keepalive Packet 2 | 18 secs. | |
| GRE Keepalive Packet 3 | 20 secs. | |
| GRE Keepalive Packet 4 | | Yes |
| GRE Keepalive Packet 5 | 22 secs. | |
| GRE Keepalive Packet 6 | 18 secs. | |
| GRE Keepalive Packet 7 | 22 secs. | |
| GRE Keepalive Packet 8 | | Yes |
| GRE Keepalive Packet 9 | 22 secs. | |
| GRE Keepalive Packet 10 | 20 secs. | |

From the above round trip latency measures, edge network device 202 may determine the average latency over the specific QoS measurement time period to be 20.25 seconds ((20+18+20+22+18+22+22+20)/8). Edge network device 202 may determine the jitter measures to be 2 seconds (difference between 20 and 18), 2 seconds (difference between 18 and 20), 4 seconds (difference between 22 and 18), 4 seconds (difference between 18 and 22), and 2 seconds (difference between 22 and 20). Edge network device 202 may determine the average jitter over the specific QoS measurement time period to be 2.6 seconds ((2+2+4+4+2)/5). Edge network device 202 may determine the number of lost packets over the specific QoS measurement time period to be 2 (GRE keepalive packets 4 and 8).

In a similar manner as discussed above, edge network device 202 may determine QoS measures of additional GRE tunnels.

Modifications, additions, or omissions may be made to FIG. 2 without departing from the scope of the present disclosure. For example, any number of GRE keepalive packets may be transmitted and/or received between the edge network devices 202 and 204. As another example, there may be one or more additional tunnels configured between edge network devices 202 and 204.

Figure 3:
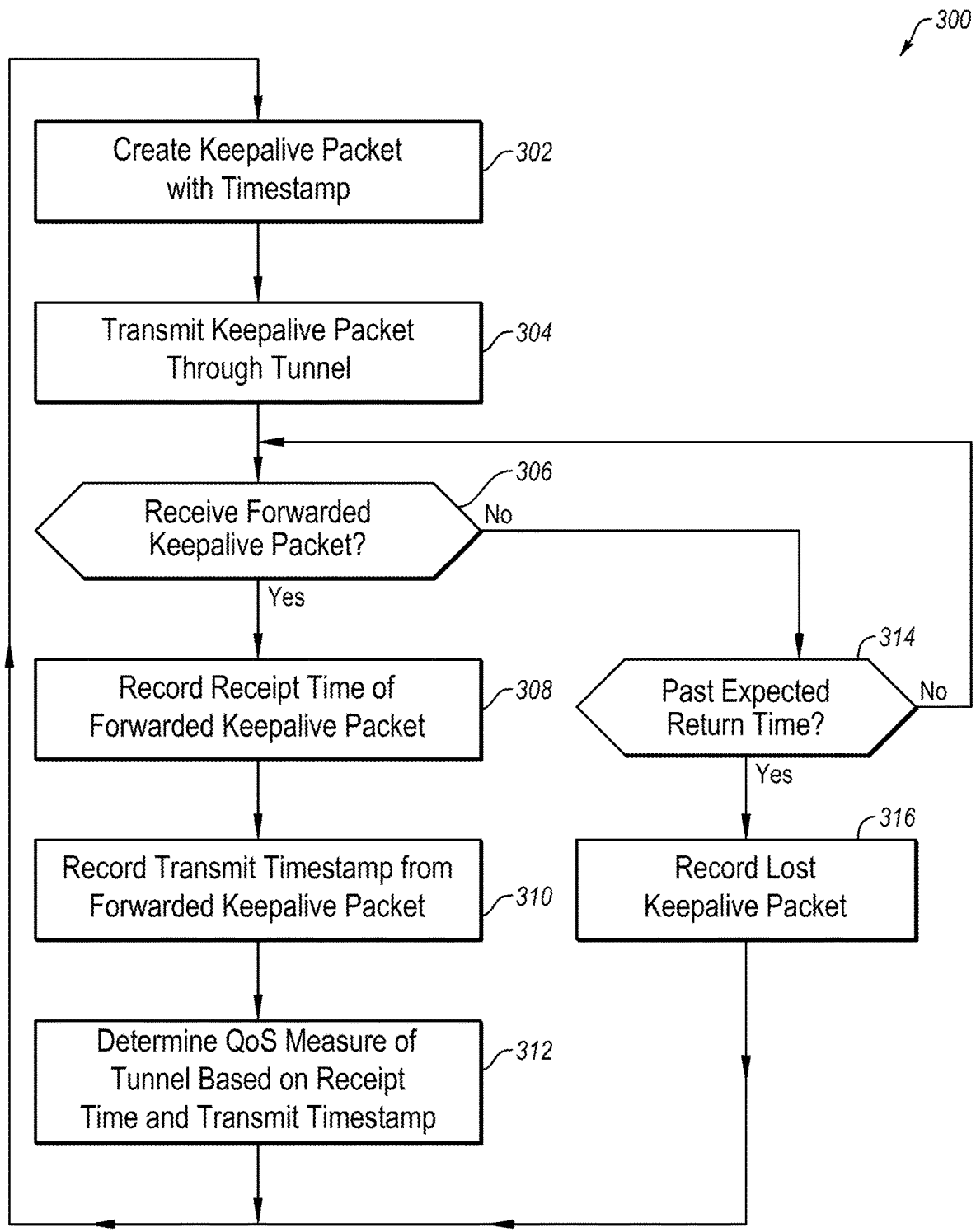
FIG. 3 is a flow diagram that illustrates an example process to measure QoS of a GRE tunnel.

FIG. 3 is a flow diagram 300 that illustrates an example process to measure QoS of a GRE tunnel, arranged in accordance with at least some embodiments described herein. Example processes and methods may include one or more operations, functions or actions as illustrated by one or more of blocks 302, 304, 306, 308, 310, 312, 314, and/or 316, and may in some embodiments be performed by an endpoint such as an edge network device 602 of FIG. 6. The operations described in blocks 302-316 may also be stored as computer-executable instructions in a computer-readable medium such as a memory 614 and/or a data storage 616 of edge network device 602.

As depicted by flow diagram 300, the example process to measure QoS of a GRE tunnel may begin with block 302 ("Create Keepalive Packet with Timestamp"), where a tunnel source endpoint may create a GRE keepalive packet at a specified keepalive time interval, and include a current time stamp in the payload field of the GRE keepalive packet. The current time stamp indicates a time that the GRE keepalive packet is being transmitted.

Block 302 may be followed by block 304 ("Transmit Keepalive Packet through Tunnel"), where the tunnel source endpoint may transmit the GRE keepalive packet that includes the current time stamp in the payload field to a tunnel destination endpoint at the other end of the GRE tunnel.

Block 304 may be followed by decision block 306 ("Receive Forwarded Keepalive Packet?"), where the tunnel source endpoint may determine whether a forwarded GRE keepalive packed is received. For example, subsequent to transmitting a GRE keepalive packet through a GRE tunnel, the tunnel source endpoint may wait up to an expected return time period to receive a forwarded GRE keepalive packet from the tunnel destination endpoint at the other end of the GRE tunnel. If the tunnel source endpoint determines that it received a forwarded GRE keepalive packet, decision block 306 may be followed by block 308 ("Record Receipt Time of Forwarded Keepalive Packet") where the tunnel source endpoint may record the time that it received the forwarded GRE keepalive packet.

Block 308 may be followed by block 310 ("Record Transmit Timestamp from Forwarded Keepalive Packet"), where the tunnel source endpoint may record the time that it transmitted the GRE keepalive packet that produced the received forwarded GRE keepalive packet. The tunnel source endpoint may determine the time that it transmitted the GRE keepalive packet from the timestamp included in the payload field of the received forwarded GRE keepalive packet. In some embodiments, the tunnel source endpoint may maintain a record of the transmit times for the GRE keepalive packets transmitted by the tunnel source endpoint. In this instance, the tunnel source endpoint may determine the time that it transmitted the GRE keepalive packet from the maintained record of transmit times.

Block 310 may be followed by block 312 ("Determine QoS Measure of Tunnel based on Receipt Time and Transmit Timestamp"), where the tunnel source endpoint may determine QoS measures, such as, a roundtrip latency, jitter, etc., of the GRE tunnel based on the recorded transmit times and receipt times. For example, the tunnel source endpoint may transmit a multiple number of GRE keepalive packets over a specified time period, one GRE keepalive packet transmitted at each specified keepalive time interval, and determine QoS measures of the GRE tunnel using the multiple transmit times and receipt times. Additionally or alternatively, the tunnel source endpoint may determine average QoS measures of the GRE tunnel by averaging the QoS measurements taken over a specified time period.

Otherwise, if, at decision block 306, the tunnel source endpoint determines that it did not receive a forwarded GRE keepalive packet, decision block 306 may be followed by decision block 314 ("Past Expected Return Time?"), where the tunnel source endpoint may determine whether the expected return time has passed. That is, whether the tunnel source endpoint has waited for the expected return time period without receiving a forwarded GRE keepalive packet. If the tunnel source endpoint determines that it has not waited for the expected return time period, decision block 314 may be followed by decision block 306 where the tunnel source endpoint may check to determine whether a forwarded GRE keepalive packet is received. Otherwise, if the tunnel source endpoint determines that it has waited for the expected return time period, decision block 314 may be followed by block 316 ("Record Lost Keepalive Packet"), where the tunnel source endpoint may determine that the transmitted GRE keepalive packet is lost. That is, the tunnel source endpoint may conclude that it will not be receiving a forwarded GRE keepalive packet from the tunnel destination endpoint at the other end of the GRE tunnel. The tunnel source endpoint may maintain a count of the lost GRE keepalive packets. For example, the tunnel source endpoint may increment by 1 a count of the lost GRE keepalive packets.

Those skilled in the art will appreciate that, for this and other processes and methods disclosed herein, the functions performed in the processes and methods may be implemented in differing order. Furthermore, the outlined actions and operations are only provided as examples, and some of the actions and operations may be optional, combined into fewer actions and operations, or expanded into additional actions and operations without detracting from the essence of the disclosed embodiments.

Figure 4:
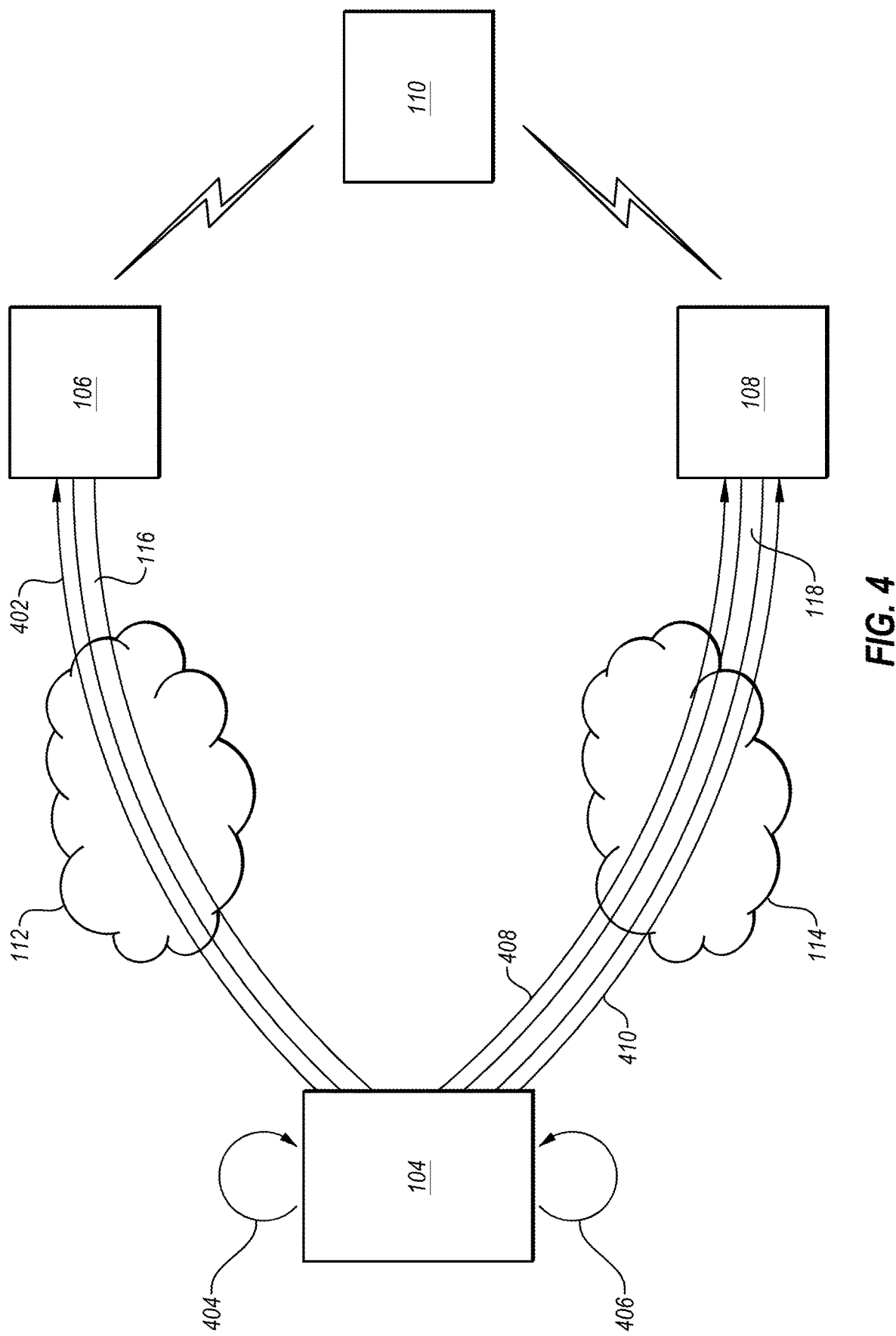
FIG. 4 illustrates transmitting of data packets through an arbitrary tunnel and a preferred tunnel.

FIG. 4 illustrates transmitting of data packets through an arbitrary tunnel and a preferred tunnel, arranged in accordance with at least some embodiments described herein. Those components in FIG. 4 that are labeled identically to components of FIG. 1 will not be described again for the purposes of clarity.

As described above in conjunction with FIG. 1, edge network device 104 may send data packets destined for cloud domain 110 either through tunnel 116 to edge network device 106 or through tunnel 118 to edge network device 108 based on one or more policies and/or one or more properties of the available tunnels. For example, tunnels 116 and 118 may be GRE tunnels, and the applied policy may be to select the GRE tunnel that provides the better QoS. Not knowing which of tunnels 116 or 118 provides the better QoS, edge network device 104 may arbitrarily select one of the tunnels, for example, tunnel 116, and start transmitting the data packets (e.g., data flow) destined for cloud domain 110 through tunnel 116 (402). Because edge network device 104 is sending the data flow through an arbitrarily selected tunnel, edge network device 104 may buffer the data packets sent through tunnel 116 until it determines the tunnel that provides the better QoS (404). Contemporaneously, edge network device 104 may determine which of tunnels 116 or 118 provide the better QoS by sending GRE keepalive packets and receiving forwarded GRE keepalive packets through each of tunnels 116 and 118 to measure QoS as described herein (406). Suppose edge network device 104 determines that tunnel 118 provides the better QoS. Subsequent to determining that tunnel 118 provides better QoS than tunnel 116, edge network device 104 may designate tunnel 118 as the preferred tunnel and replay the buffered data packets through tunnel 118 (the preferred tunnel) (408). Edge network device 104 may then send the subsequent data packets through tunnel 118. Only two tunnels are shown in FIG. 4 and used in the example for simplicity, and one skilled in the art will appreciate that there may be a different number of tunnels.

Modifications, additions, or omissions may be made to FIG. 4 without departing from the scope of the present disclosure. For example, there may be one or more additional tunnels configured between edge network devices 104 and 106, and/or between edge network devices 104 and 108. As another example, there may be one or more additional tunnels configured between edge network device 104 and edge network devices other than edge network device 106 or 108.

Figure 5:
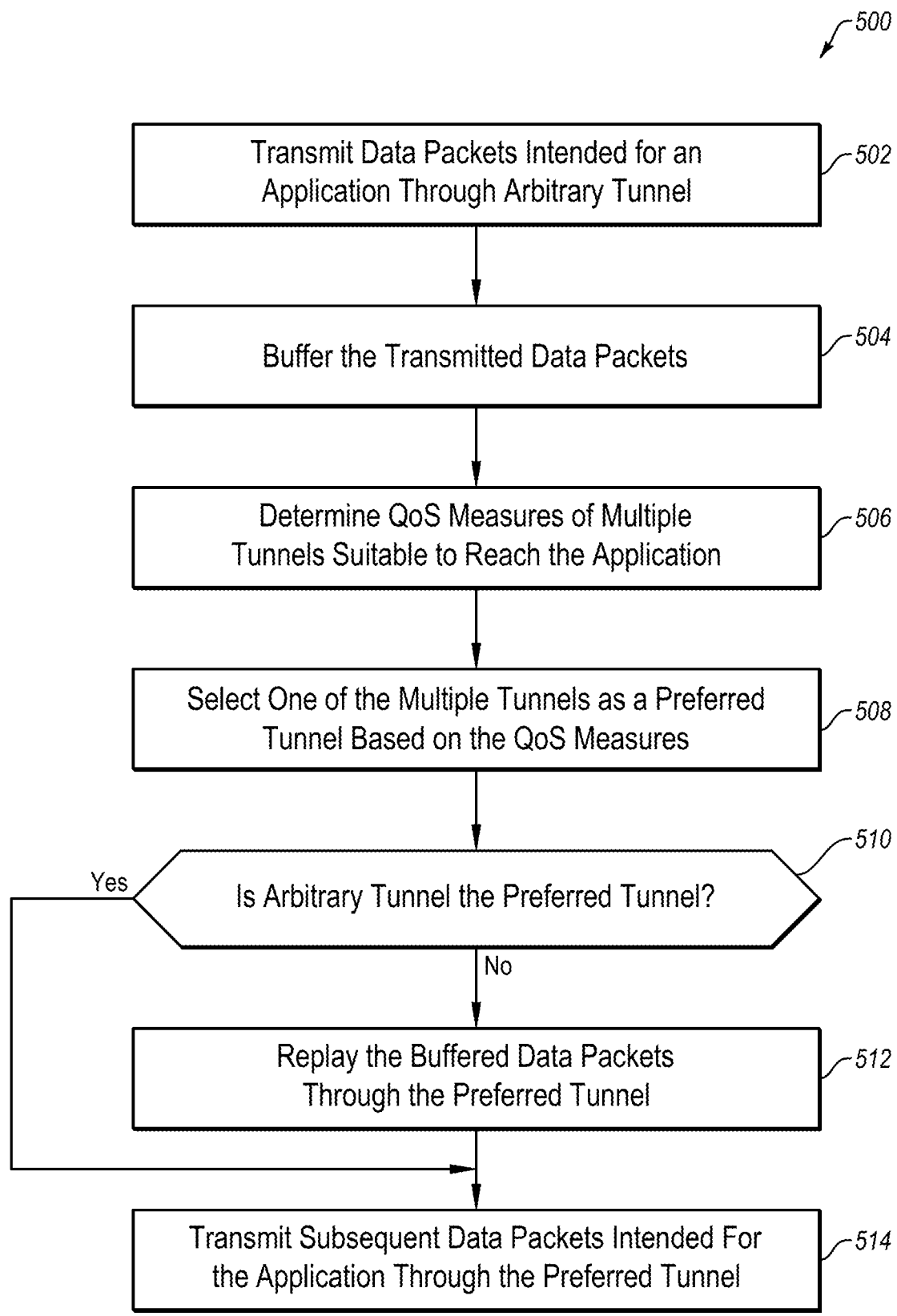
FIG. 5 is a flow diagram that illustrates an example process to transmit data packets through a GRE tunnel based on a QoS of the GRE tunnel.

FIG. 5 is a flow diagram 500 that illustrates an example process to transmit data packets through a GRE tunnel based on a QoS of the GRE tunnel, arranged in accordance with at least some embodiments described herein. Example processes and methods may include one or more operations, functions or actions as illustrated by one or more of blocks 502, 504, 506, 508, 510, 512, and/or 514, and may in some embodiments be performed by an endpoint such as edge network device 602 of FIG. 6. The operations described in blocks 502-514 may also be stored as computer-executable instructions in a computer-readable medium such as a memory 614 and/or a data storage 616 of edge network device 602.

As depicted by flow diagram 500, the example process to transmit data packets through a GRE tunnel based on a QoS of the GRE tunnel may begin with block 502 ("Transmit Data Packets Intended for an Application through an Arbitrary Tunnel"), where a network device, such as edge network device 106, may start transmitting data packets intended for an application through an arbitrary GRE tunnel. For example, multiple GRE tunnels suitable for sending the data packet to the application may be configured between the network device and one or more remote network devices, and the network device may apply a policy to use the GRE tunnel with the least latency. Not knowing the GRE tunnel with the least latency, the network device may select one of the GRE tunnels as the arbitrary GRE tunnel, and start transmitting the data packets through the arbitrary GRE tunnel.

Block 502 may be followed by block 504 ("Buffer the Transmitted Data Packets"), where the network device buffers the data packets that are sent through the arbitrary GRE tunnel. For example, the network device may buffer the data packets in a local memory.

Block 504 may be followed by block 506 ("Determine QoS Measures of Multiple Tunnels Suitable to Reach the Application"), where the network device determines which of the multiple GRE tunnels provides the least latency. For example, the network device may measure the latencies of each of the multiple GRE tunnels.

Block 506 may be followed by block 508 ("Select One of the Multiple Tunnels as a Preferred Tunnel based on the QoS Measures"), where the network device selects the GRE tunnel with the least latency as a preferred GRE tunnel.

Block 508 may be followed by decision block 510 ("Is Arbitrary Tunnel the Preferred Tunnel?"), where the network device determines whether the arbitrary GRE tunnel and the preferred GRE tunnel are the same. If the arbitrary GRE tunnel is the not the same as the preferred GRE tunnel, decision block 510 may be followed by block 512 ("Replay the Buffered Data Packets through the Preferred Tunnel"), where the network device may replay (re-transmit) the buffered data packets through the preferred GRE tunnel.

Block 512 may be followed by block 514 ("Transmit Subsequent Data Packets Intended for the Application through the Preferred Tunnel"), where the network device may transmit the subsequent data packets intended for the application through the preferred GRE tunnel. Having determined the preferred GRE tunnel (the GRE tunnel with the least latency) and replayed the buffered data packets through the preferred GRE tunnel, the network device does not need to continue transmitting the data packets through the arbitrary GRE tunnel.

Otherwise, if the arbitrary GRE tunnel is the same as the preferred GRE tunnel, decision block 510 may be followed by block 514, where the network device may transmit the subsequent data packets intended for the application through the preferred GRE tunnel. Where the arbitrary GRE tunnel is the same as the preferred GRE tunnel, there is no need to replay (re-transmit) the data packets that were already sent through the arbitrary GRE tunnel (already sent through the preferred GRE tunnel).

In some embodiments, the remote devices with which the multiple tunnels are configured may be provided by the application. In other embodiments, the remote devices with which the multiple tunnels are configured may be provided by a third-party application, different than the application. In this instance, the remote devices may provide a necessary level of service (e.g., the needed level of service) from the remote device to the application, thus allowing the network device to use the GRE tunnel that satisfies its applied policy or policies.

Figure 6:
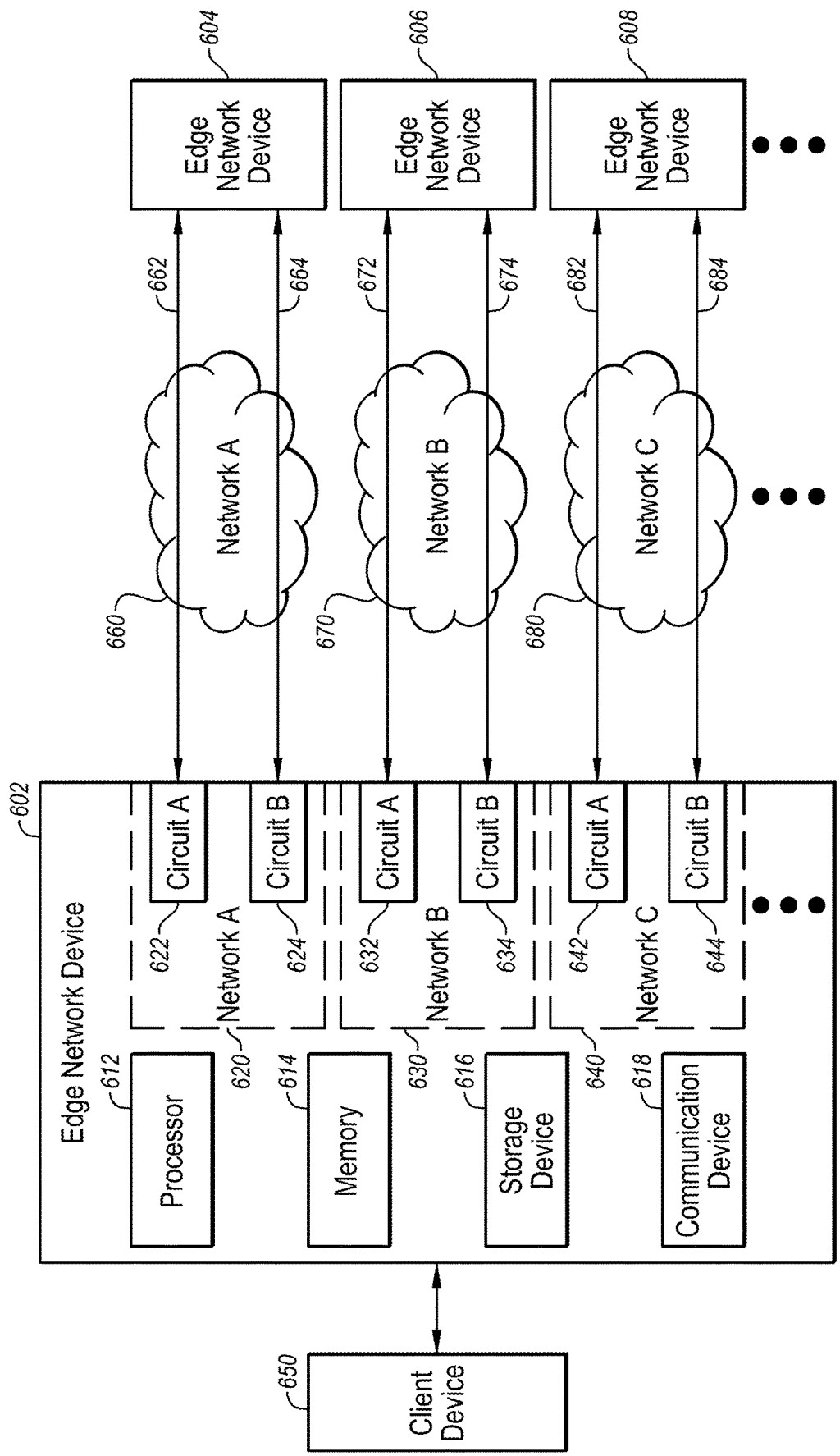
FIG. 6 illustrates an environment of an edge network device that may be used to measure QoS of a GRE tunnel, all arranged in accordance with at least some embodiments described herein.

FIG. 6 illustrates an environment 600 of edge network device 602 that may be used to measure QoS of a GRE tunnel, arranged in accordance with at least some embodiments described herein. As depicted, edge network device 602 that may include multiple potential connections for communicating with other edge network devices 604, 606, and 608. For example, edge network device 602 may communicate with edge network device 604 using a network A 660, with edge network device 606 using a network B 670, and/or with edge network device 608 using a network C 680. Edge network devices 602, 604, 606, and 608 may be similar or comparable to edge network devices 104, 106, and 108 of FIG. 1 and FIG. 4 and/or edge network devices 202 and 204 of FIG. 2. Environment 600 may additionally include a client device 650 that may be communicatively coupled to edge network device 602, for example, across an external network domain.

In some embodiments, edge network device 602 may include a network A connection 620, a network B connection 630, and a network C connection 640. As illustrated by the ellipses below network C connection 640, any number of additional or other potential connections may also be included. In these and other embodiments, edge network device 602 may include multiple circuits for connecting to the one or more potential connections. For example, edge network device 602 may include a circuit A 622 and a circuit B 624 for network A connection 620, a circuit A 632 and a circuit B 634 for network B connection 630, and a circuit A 642 and a circuit B 644 for network C connection 640. In these and other embodiments, edge network device 602 may be configured to route traffic along one or more of the circuits, based on one or more policies stored by edge network device 602.

In some embodiments, edge network device 602 may be configured to monitor one or more properties of the various connections. For example, edge network device 602 may monitor the jitter, latency, loss, and/or bandwidth of the various communication links from edge network device 602 to edge network device 604, 606, and/or 608. In these and other embodiments, edge network device 602 may also monitor and/or store security properties of the various communication links. For example, links 662 and 664 over network A 660 may be considered at a first level of security, links 672 and 674 over network B 670 may be considered at a second level of security, and links 682 and 684 over network C 680 may be considered at a third level of security. In some embodiments, one or more of links 662, 664, 672, 674, 682, and/or 684 may be tunnels, such as GRE tunnels.

In some embodiments, edge network device 602 may route traffic intended for one or more applications to specific circuits based on one or more policies and/or based on one or more properties of the various connections. For example, a video application may be particularly susceptible to jitter. Edge network device 602 may determine that the video traffic may be travelling across link 682 with a jitter of 10 ms, and that link 662 may have a jitter of 4 ms. In this instance, edge network device 602 may shift the traffic for the video application to link 662 rather than link 682 because of the lower jitter. In some embodiments, shifting from link 682 to link 662 may be based on a jitter-based SLA. As another example, edge network device 602 may receive a data flow for a security-sensitive application (such as an accounting application) and may have a policy that data for that application is to be routed along one of network B links 672 and/or 674, even if other traffic may be routed along network A link 662. As a further example, edge network device 602 may include an SLA that a given application have a bandwidth of 10 MB/s available to the application. In this instance, edge network device 602 may make link 662 over network A 660 available to the application, but link 662 may provide 5 MB/s of bandwidth. Edge network device 602 may also provide links 682 and 684 to the application such that the overall combined bandwidth of links 662, 682, and 684 meet or exceed the bandwidth agreement of the SLA. In these and other embodiments, edge network device 602 may be configured to perform such routing based on initially receiving a data flow, during an on-going data flow, based on a triggering event of the data flow, and/or others or combinations thereof. Additionally or alternatively, such routing may combine multiple links of multiple types of connections for a single flow in routing traffic flows.

In some embodiments, edge network device 602 may be configured to route traffic to the various links based on the source of the traffic. For example, one or more policies may indicate that traffic from one corporate department of a business be routed along network B connection 630, while traffic for another corporate department may be routed along any link.

In some embodiments, edge network device 602 may include a processor 612, a memory 614, a storage device 616, and/or a communication device 618. Generally, processor 612 may include any suitable special-purpose or general-purpose computer, computing entity, or processing device including various computer hardware or software modules, and may be configured to execute instructions stored on any applicable computer-readable storage media. For example, processor 612 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that processor 612 may include any number of processors distributed across any number of network or physical locations that are configured to perform individually or collectively any number of operations described in the present disclosure. In some embodiments, processor 612 may interpret and/or execute program instructions and/or process data stored in memory 614, storage device 616, or memory 614 and storage device 616. In some embodiments, processor 612 may fetch program instructions from data storage 616 and load the program instructions into memory 614. After the program instructions are loaded into memory 614, processor 612 may execute the program instructions.

Memory 614 and storage device 616 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 612. In some embodiments, edge network device 602 may or may not include either of memory 614 and storage device 616.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 612 to perform a certain operation or group of operations.

Communication device 618 may include any component, device, system, or combination thereof that is configured to transmit or receive information. In some embodiments, communication device 618 may communicate with other devices at other locations, the same location, or even other components within the same system. For example, communication device 618 may include a modem, a network card (wireless or wired), an optical communication device, a radio frequency transducer, an ultrasonic transducer, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like, and/or combinations thereof. Communication device 618 may permit data to be exchanged with a network and/or any other devices or systems described in the present disclosure. For example, communication device 618 may allow edge network device 602 to communicate with other systems, such as any one or more of edge network devices 604, 606, and 608.

Modifications, additions, or omissions may be made to environment 600 of FIG. 6 without departing from the scope of the present disclosure. For example, while illustrated as including a certain number of edge network devices 602, 604, 606, and 608, environment 600 may include any number of edge network devices. As another example, while illustrated as including three communication networks (network A 660, network B 670, and network C 680) any number of communication networks may be utilized.

As indicated above, the embodiments described in the present disclosure may include the use of a special purpose or general purpose computer (e.g., processor 612 of FIG. 6) including various computer hardware or software modules, as discussed in greater detail herein. Further, as indicated above, embodiments described in the present disclosure may be implemented using computer-readable media (e.g., memory 614 of FIG. 6) for carrying or having computer-executable instructions or data structures stored thereon.

While described in the context of a GRE tunnel, it will be appreciated that any network tunnel is also within the scope of the present disclosure. Moreover, although described in the context of a GRE keepalive packet, it will be appreciated that any packet that may be transmitted and reflected back through the network tunnel are also within the scope of the present disclosure.

According to some examples, methods to measure quality of service (QoS) of a network tunnel at an endpoint are described. An example method to measure QoS of a network tunnel at an endpoint may include configuring a network tunnel from the endpoint to a tunnel destination endpoint, the endpoint being the tunnel source endpoint; transmitting by the endpoint multiple status packets to the tunnel destination endpoint, each of the status packets including a timestamp in a payload field of the status packet, the timestamp indicating a time of transmission of the respective status packet from the endpoint to the tunnel destination endpoint; receiving by the endpoint multiple forwarded status packets from the tunnel destination endpoint, each of the forwarded status packets being a return of a corresponding status packet transmitted by the endpoint to the tunnel destination endpoint; determining a time of receipt of each of the forwarded status packets; and determining a QoS measure of the network tunnel based on the time of transmission of each of the multiple status packets and the time of receipt of each of the forwarded status packets. In some examples, the QoS measure may include a latency measure. In some examples, the QoS measure may include a jitter measure.

According to other examples, the method may also include determining a number of expected forwarded status packets that are not received; and determining a number of lost status packets based on the number of expected forwarded status packets that are not received. According to further examples, each of the multiple status packets may be transmitted at a specific time interval. In some examples, the QoS measure may be averaged out over a specific time period. In some examples, the network tunnel may include a generic routing encapsulation (GRE) tunnel, and the status packet may include a GRE keepalive packet.

According to other examples, tunnel source endpoints configured to determine QoS of network tunnels are described. An example tunnel source endpoint may include a memory configured to store instructions and a processor configured to execute the instructions. Execution of the instructions may cause the processor to transmit multiple status packets to a tunnel destination endpoint, each of the status packets including a timestamp in a payload field of the status packet, the timestamp indicating a time of transmission of the respective status packet from the endpoint to the tunnel destination endpoint; receive multiple forwarded status packets from the tunnel destination endpoint, each of the forwarded status packets being a return of a corresponding status packet transmitted by the endpoint to the tunnel destination endpoint; determine a time of receipt of each of the forwarded status packets; and determine a QoS measure of the network tunnel based on the time of transmission of each of the multiple status packets and the time of receipt of each of the forwarded status packets. In some examples, the tunnel source endpoint may include a router. In some examples, the tunnel destination endpoint may include a secure web gateway. In some examples, the network tunnel may include a generic routing encapsulation (GRE) tunnel, and the status packet may include a GRE keepalive packet.

According to some examples, methods to transmit data packets through a network tunnel based on a QoS of the network tunnel are described. An example method to transmit data packets through a network tunnel based on a QoS of the network tunnel may include, by a tunnel source endpoint, transmitting data packets through an arbitrary network tunnel of multiple network tunnels, each of the multiple network tunnels being from the tunnel source endpoint to a respective one of a multiple tunnel destination endpoints, the data packets destined for an application; buffering the transmitted data packets destined for the application; selecting one network tunnel of the multiple network tunnels as a preferred network tunnel for transmitting data packets destined for the application, the selecting of the one network tunnel of the multiple network tunnels being based on QoS measures of each of the multiple network tunnels, wherein the QoS measures are determined based on transmission of status packets to each of the multiple tunnel destination endpoints; and transmitting subsequent data packets destined for the application through the selected one network tunnel of the multiple network tunnels.

According to other examples, the method may also include replaying the buffered data packets destined for the application through the selected one network tunnel of the multiple network tunnels in response to a determination that the selected one network tunnel of the multiple network tunnels is different than the arbitrary network tunnel of the multiple network tunnels. In some examples, the network tunnel may include a generic routing encapsulation (GRE) tunnel, and the status packet may include a GRE keepalive packet.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    first selecting an initial tunnel of a plurality of network tunnels;
    first transmitting data packets over the initial tunnel to a destination;
    buffering the transmitted data packets;
    second selecting a preferred tunnel of the plurality of network tunnels as a preferred network tunnel for transmitting the data packets;
    in response to the preferred tunnel being different from the initial tunnel;
        discontinuing the first transmitting;
        retransmitting the buffered the transmitted data packets through the preferred tunnel; and
        second transmitting subsequent data packets destined for the destination through the preferred tunnel;
    wherein when the second selecting selects the initial tunnel as the preferred tunnel, the first transmitting sent the data packets with a head start relative to waiting for the second selecting and second transmitting; and
    wherein when the second selecting does not select the initial tunnel as the preferred tunnel, the retransmitting restarts transmission of the data packets by resending the previously transmitted data packets.

2. The method of claim 1, wherein the plurality of network tunnels include a generic routing encapsulation (GRE) tunnel.

3. The method of claim 1, wherein the first selecting comprises arbitrarily selecting the initial tunnel from the plurality of network tunnels.

4. The method of claim 1, wherein the second selecting being based on at least one QoS measure of each of the plurality of network tunnels.

5. The method of claim 4, wherein the at least one QoS measure includes a latency measure.

6. The method of claim 4, wherein the at least one QoS measure includes a jitter measure.

7. The method of claim 4, wherein the at least one QoS measure is averaged out over a specific time period.

8. A non-transitory computer readable medium containing instructions which when executed case a system to perform operations comprising:
    first selecting an initial tunnel of a plurality of network tunnels;
    first transmitting data packets over the initial tunnel to a destination;
    buffering the transmitted data packets;
    second selecting a preferred tunnel of the plurality of network tunnels as a preferred network tunnel for transmitting the data packets;
    in response to the preferred tunnel being different from the initial tunnel;
        discontinuing the first transmitting;
        retransmitting the buffered the transmitted data packets through the preferred tunnel; and
        second transmitting subsequent data packets destined for the destination through the preferred tunnel;
    wherein when the second selecting selects the initial tunnel as the preferred tunnel, the first transmitting sent the data packets with a head start relative to waiting for the second selecting and second transmitting; and
    wherein when the second selecting does not select the initial tunnel as the preferred tunnel, the retransmitting restarts transmission of the data packets by resending the previously transmitted data packets.

9. The non-transitory computer readable medium of claim 8, wherein the plurality of network tunnels include a generic routing encapsulation (GRE) tunnel.

10. The non-transitory computer readable medium of claim 8, wherein the first selecting comprises arbitrarily selecting the initial tunnel from the plurality of network tunnels.

11. The non-transitory computer readable medium of claim 8, wherein the second selecting being based on at least one QoS measure of each of the plurality of network tunnels.

12. The non-transitory computer readable medium of claim 11, wherein the at least one QoS measure includes a latency measure.

13. The non-transitory computer readable medium of claim 11, wherein the at least one QoS measure includes a jitter measure.

14. The non-transitory computer readable medium of claim 11, wherein the at least one QoS measure is averaged out over a specific time period.

15. A system, comprising:
    a non-transitory computer readable medium containing instructions;
    a processor programmed to cooperate with the instructions to execute operations comprising:
        first selecting an initial tunnel of a plurality of network tunnels;
        first transmitting data packets over the initial tunnel to a destination;
        buffering the transmitted data packets;
        second selecting a preferred tunnel of the plurality of network tunnels as a preferred network tunnel for transmitting the data packets;
        in response to the preferred tunnel being different from the initial tunnel;
            discontinuing the first transmitting;
            retransmitting the buffered the transmitted data packets through the preferred tunnel; and
            second transmitting subsequent data packets destined for the destination through the preferred tunnel;
        wherein when the second selecting selects the initial tunnel as the preferred tunnel, the first transmitting sent the data packets with a head start relative to waiting for the second selecting and second transmitting; and
        wherein when the second selecting does not select the initial tunnel as the preferred tunnel, the retransmitting restarts transmission of the data packets by resending the previously transmitted data packets.

16. The non-transitory computer readable medium of claim 15, wherein the plurality of network tunnels include a generic routing encapsulation (GRE) tunnel.

17. The non-transitory computer readable medium of claim 15, wherein the first selecting comprises arbitrarily selecting the initial tunnel from the plurality of network tunnels.

18. The non-transitory computer readable medium of claim 15, wherein the second selecting being based on at least one QoS measure of each of the plurality of network tunnels.

19. The non-transitory computer readable medium of claim 18, wherein the at least one QoS measure includes a latency measure.

20. The non-transitory computer readable medium of claim 18, wherein the at least one QoS measure includes a jitter measure.

\* \* \* \* \*